United States Patent
Cheng

(10) Patent No.: US 6,731,501 B1
(45) Date of Patent: *May 4, 2004

(54) HEAT DISSIPATING DEVICE FOR DISSIPATING HEAT GENERATED BY A DISK DRIVE MODULE INSIDE A COMPUTER HOUSING

(76) Inventor: Jian-Roung Cheng, 9F, No. 90, Hsing-Te Rd., San-Chung City, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/336,208

(22) Filed: Jan. 3, 2003

(51) Int. Cl.$^7$ ................................................. G06F 1/16
(52) U.S. Cl. ........................ 361/685; 361/709; 361/818; 165/80.3
(58) Field of Search ............................... 361/685, 816, 361/818, 695–697, 709, 683; 369/75.1–82; 248/618, 633–638; 312/223.1, 223.2

(56) References Cited

U.S. PATENT DOCUMENTS 6,453,987 B1 * 9/2002 Cheng ........................ 165/80.3

2002/0093788 * 7/2002 Rothschild ................... 361/685

* cited by examiner

Primary Examiner—Darren Schuberg
Assistant Examiner—Anthony Q. Edwards
(74) Attorney, Agent, or Firm—Brooks Kushman P.C.

(57) ABSTRACT

In a heat dissipating device, a base plate, mounted in a drawer body of a disk drive module inside a computer housing, contacts and is in thermal communication with a disk drive. A fin strip unit is mounted fixedly on and is in thermal communication with the base plate. The fin strip unit includes a row of straight strip portions arranged along a first direction, each adjacent pair of which are spaced apart from each other so as to define a space therebetween. Multiple bridging units are disposed respectively within the spaces. Each bridging unit including multiple U-shaped strip portions, each of which has two ends connected respectively to corresponding ones of the straight strip portions. The U-shaped strip portions of each bridging unit are arranged in a row along a second direction transverse to the first direction.

7 Claims, 7 Drawing Sheets

HEAT DISSIPATING DEVICE FOR DISSIPATING HEAT GENERATED BY A DISK DRIVE MODULE INSIDE A COMPUTER HOUSING

BACKGROUND OF THE INVENTION

1. Field of the Invention

The invention relates to a heat dissipating device, more particularly to a heat dissipating device for dissipating heat generated by a disk drive module inside a computer housing.

2. Description of the Related Art

FIG. 1 illustrates a conventional disk drive module 1 for a computer device. The conventional disk drive module 1 includes a mounting frame 13, a drawer body 12, a disk drive 17 and a fan unit 14. The mounting frame 13 is mounted in a computer housing 11 of the computer device, has front and rear open ends 151, 151', and is formed with a slot 15. The drawer body 12 is mounted removably in the slot 15 and has a front open end 161, top and bottom walls 121, 123, and opposite lateral walls 122 connected to and cooperating with the top and bottom walls 121, 123 so as to confine a receiving space 16 that is accessible through the front open end 161. The disk drive 17 is mounted removably in the receiving space 16 through the front open end 161, and is mounted on the bottom wall 123 of the drawer body 12. The disk drive 17 has a bottom surface 171 that contacts the bottom wall 123 of the drawer body 12, and a top surface 172 that is spaced apart from the top wall 121 of the drawer body 12. The fan unit 14 is mounted removably on the front open end 161 of the drawer body 12 for generating air currents so as to carry away heat generated during operation of the disk drive 17.

FIG. 2 illustrates a conventional array disk drive module 2 for a computer device, which is a modification of the abovementioned conventional disk drive module 1. Unlike the abovementioned conventional disk drive module 1, the conventional array disk drive module 2 includes a plurality of drawer bodies 12' that are mounted removably in the slot 15' of the mounting frame 13' and that are arranged in an array. Each of the drawer bodies 12' has a front open end, a bottom wall 123', and opposite lateral walls 122' connected to and cooperating with the bottom wall 123' so as to confine a receiving space 16'. A plurality of disk drives 17 are mounted respectively in the receiving spaces 16' of the drawer bodies 12'.

It is noted that, when heat is generated by the disk drives 17 in the conventional disk drive module 2, the fan unit (not shown) is unable to dissipate heat effectively.

SUMMARY OF THE INVENTION

Therefore, the object of the present invention is to provide a heat dissipating device for dissipating heat generated by a disk drive module inside a computer housing with a relatively high heat-dissipating efficiency.

According to one aspect of the present invention, a heat dissipating device is adapted for dissipating heat generated by a disk drive module inside a computer housing. The disk drive module includes a mounting frame mounted in the computer housing and formed with a slot, a drawer body mounted removably in the slot and having front and rear open ends, top and bottom walls, and opposite lateral walls connected to and cooperating with the top and bottom walls so as to confine a receiving space that is accessible through one of the front and rear open ends, and a disk drive mounted removably in the receiving space through said one of the front and rear open ends and mounted on the bottom wall of the drawer body.

The heat dissipating device is adapted to be disposed in the receiving space and comprises:

abase plate adapted to be mounted between the lateral walls of the drawer body, the base plate having a contacting surface adapted to contact and to be in thermal communication with the disk drive, and a connecting surface opposite to the contacting surface; and a unitary heat-dissipating fin strip unit mounted fixedly on and in thermal communication with the connecting surface of the base plate, the fin strip unit including a row of straight strip portions arranged along a first direction, each adjacent pair of the straight strip portions being spaced apart from each other so as to define a heat-dissipating space therebetween, and a plurality of bridging units disposed respectively within the heat-dissipating spaces, each of the bridging units including a plurality of U-shaped strip portions, each of which has two ends that are connected respectively to corresponding ones of the straight strip portions, the U-shaped strip portions of each of the bridging units being disposed on one side of the corresponding ones of the straight strip portions and being arranged in a row along a second direction, which is transverse to the first direction.

According to another aspect of the present invention, a disk drive apparatus for a computer device comprises:

a mounting frame adapted to be mounted in a computer housing of the computer device and formed with a slot;

a drawer body mounted removably in the slot and having front and rear open ends, top and bottom walls, and opposite lateral walls connected to and cooperating with the top and bottom walls so as to confine a receiving space that is accessible through one of the front and rear open ends;

a disk drive mounted removably in the receiving space through said one of the front and rear open ends and mounted on the bottom wall of the drawer body; and a heat dissipating device disposed in the receiving space and including a base plate mounted between the lateral walls of the drawer body, the base plate having a contacting surface contacting and in thermal communication with the disk drive, and a connecting surface opposite to the contacting surface, and a unitary heat-dissipating fin strip unit mounted fixedly on and in thermal communication with the connecting surface of the base plate, the fin strip unit including a row of straight strip portions arranged along a first direction, each adjacent pair of the straight strip portions being spaced apart from each other so as to define a heat-dissipating space therebetween, and a plurality of bridging units disposed respectively within the heat-dissipating spaces, each of the bridging units including a plurality of U-shaped strip portions, each of which has two ends that are connected respectively to corresponding ones of the straight strip portions, the U-shaped strip portions of each of the bridging units being disposed on one side of the corresponding ones of the straight strip portions and being arranged in a row along a second direction, which is transverse to the first direction.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
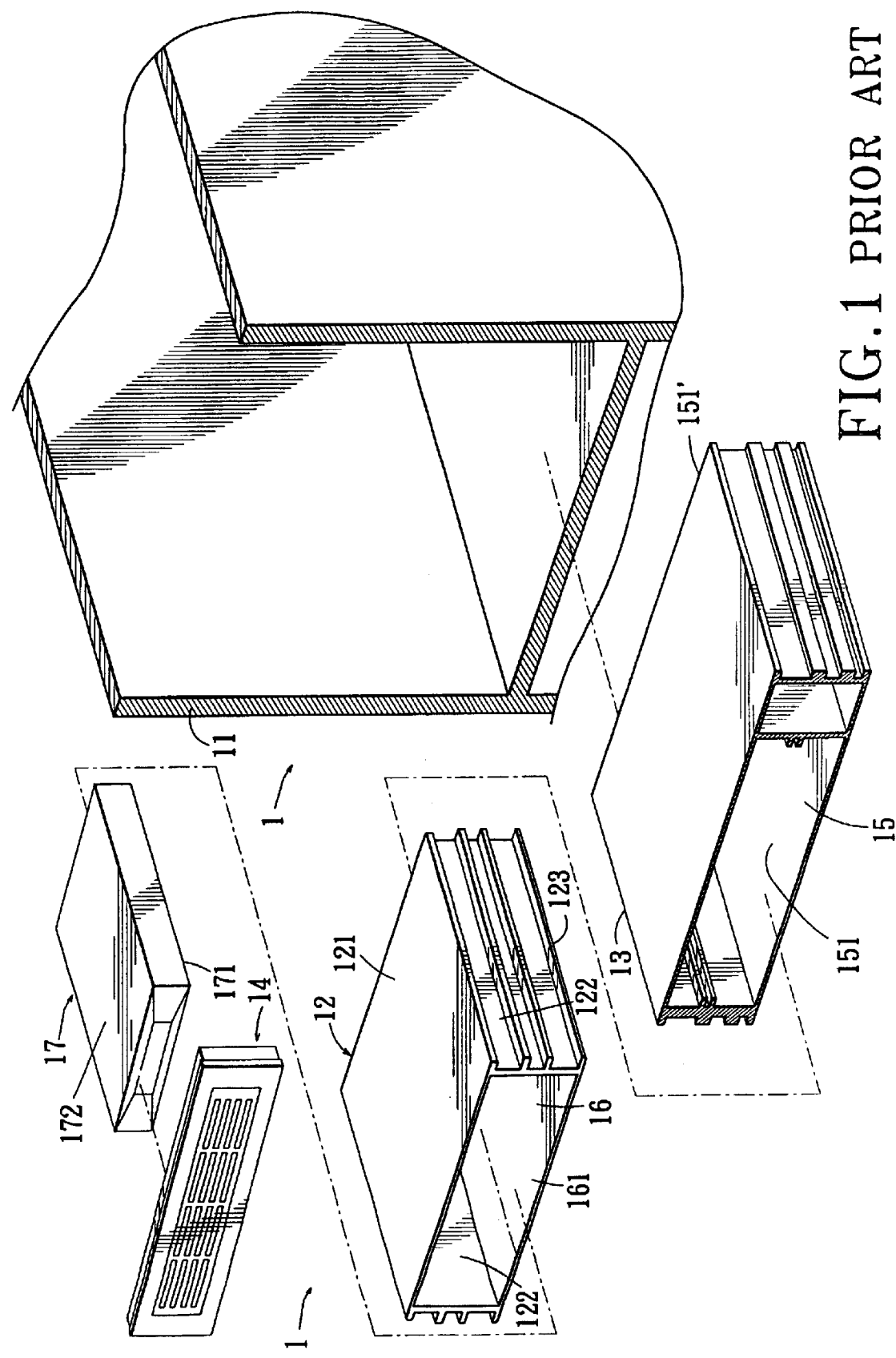
FIG. 1 is an exploded perspective view showing a conventional disk drive module inside a computer housing.
Figure 2:
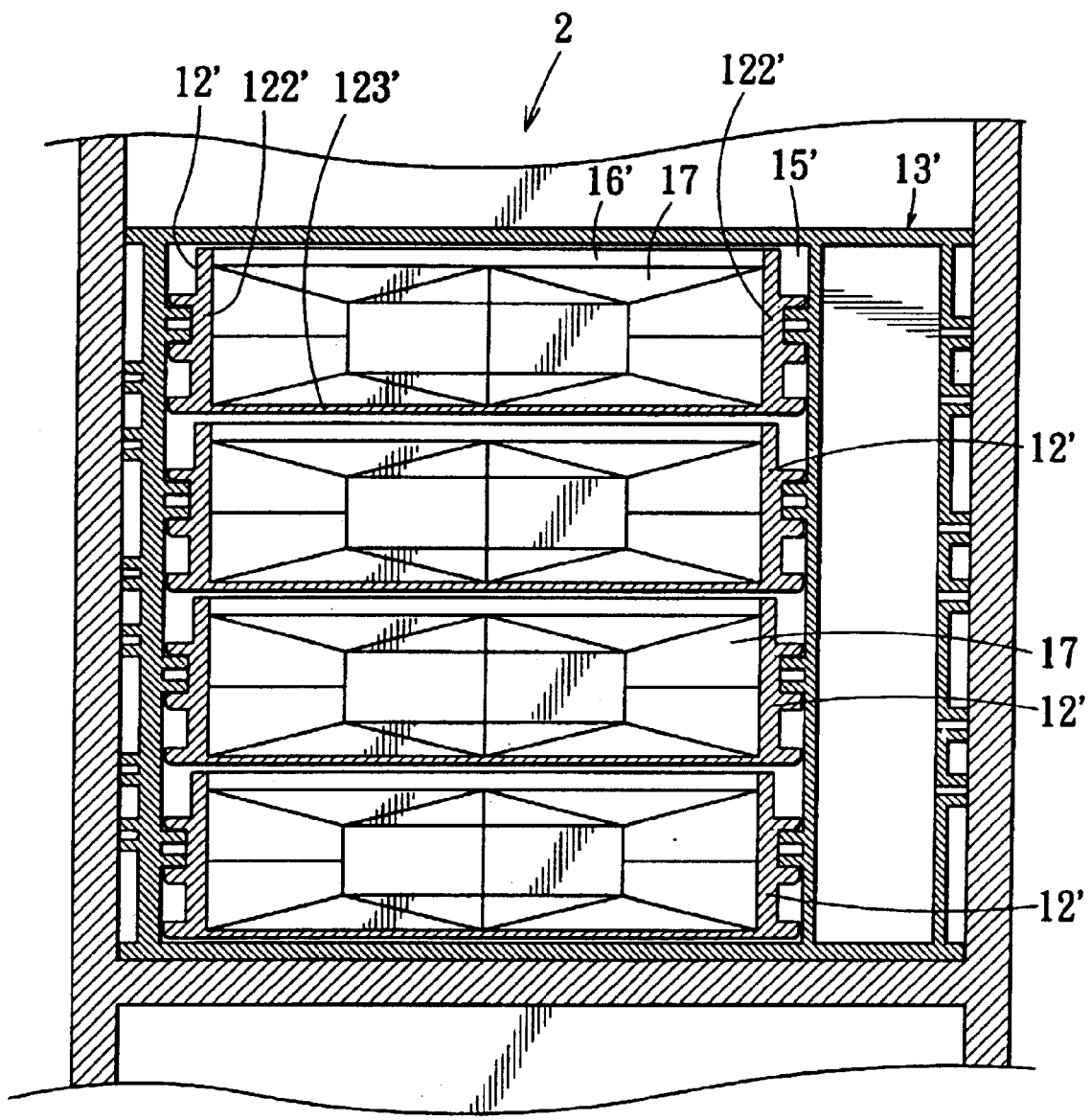
FIG. 2 is a schematic sectional view showing another conventional disk drive module inside a computer housing.

Before the present invention is described in greater detail, it should be noted that like elements are denoted by the same reference numerals throughout the disclosure.

Figure 3:
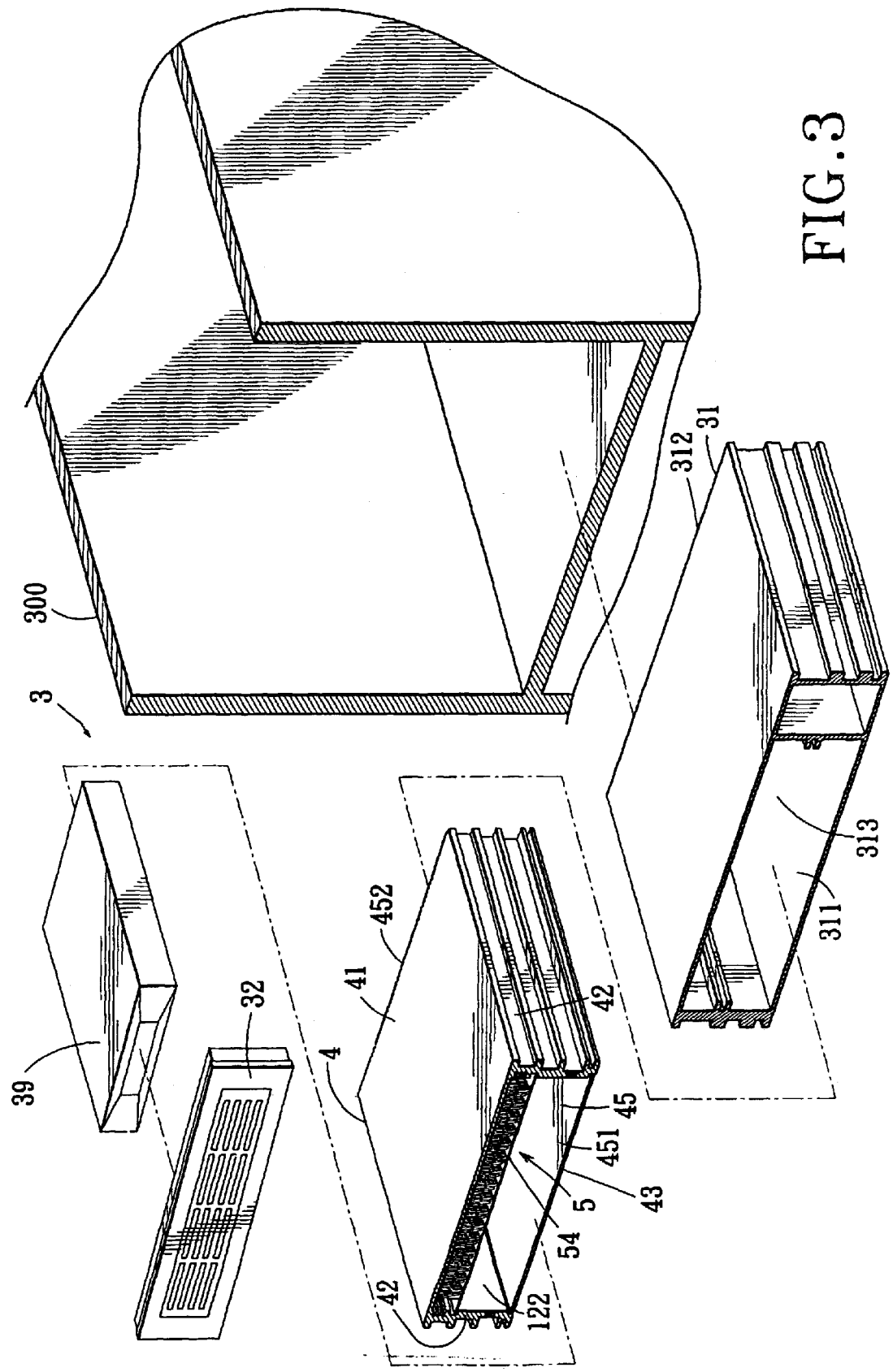
FIG. 3 is an exploded perspective view showing the first preferred embodiment of a disk drive apparatus for a computer device according to the present invention.
Figure 4:
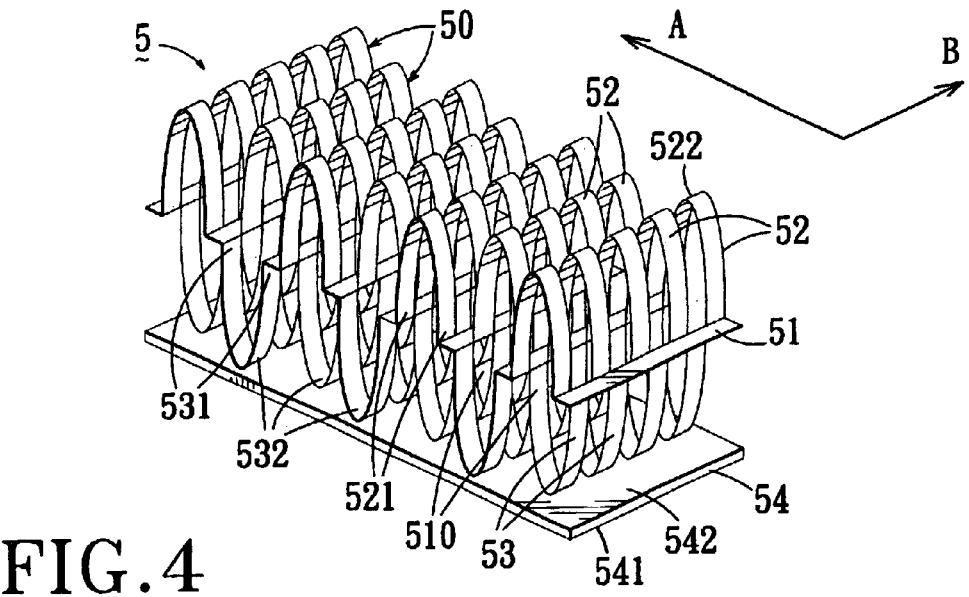
FIG. 4 is a perspective view showing a unitary heat-dissipating fin strip unit of the first preferred embodiment.

Referring to FIGS. 3 and 4, according to the first preferred embodiment of the present invention, a disk drive apparatus 3 for a computer device (not shown) is shown to include a mounting frame 31, a drawer body 4, a disk drive 39, a heat dissipating device 5, and a fan unit 32.

The mounting frame 31 is adapted to be mounted in a computer housing 300 of the computer device. The mounting frame 31 has front and rear open ends 311, 312, and is formed with a slot 313.

The drawer body 14, which is made of a heat-conductive material, such as metal, is mounted removably in the slot 313. The drawer body 14 has front and rear open ends 451, 452, top and bottom walls 41, 43, and opposite lateral walls 42 connected to and cooperating with the top and bottom walls 41, 43 so as to confine a receiving space 45 that is accessible through one of the front and rear open ends 41, 43.

The disk drive 39 is mounted removably in the receiving space 45 through said one of the front and rear open ends 451, 452, and is mounted on the bottom wall 43 of the drawer body 4.

The heat dissipating device 5 is disposed in the receiving space 45 for dissipating heat generated by the disk drive 39, and includes a base plate 54, and a unitary heat-dissipating fin strip unit. The base plate 54 is mounted between the lateral walls 42 of the drawer body 4. As shown in FIG. 4, the base plate 54 has a contacting-surface 541 to contact and to be in thermal communication with the disk drive 39, and a connecting surface 542 opposite to the contacting surface 541. The unitary heat-dissipating fin strip unit is mounted fixedly on and is in thermal communication with the connecting surface 542. The fin strip unit includes a row of straight strip portions 51, and a plurality of bridging units 50. The straight strip portions 51 are arranged along a first direction (A). Each adjacent pair of the straight strip portions 51 are spaced apart from each other so as to define a heat-dissipating space 510 therebetween. The bridging units 50 are disposed respectively within the heat-dissipating spaces 510. In this embodiment, each of the bridging units 50 includes a plurality of first and second U-shaped strip portions 52, 53. Each of the first U-shaped strip portions 52 has two ends 521 that are connected respectively to corresponding ones of the straight strip portions 51. The first U-shaped strip portions 52 of each of the bridging units 50 are disposed on an upper side of the corresponding ones of the straight strip portions 51, and are arranged in a row along a second direction (B), which is transverse to the first direction (A). Each of the first U-shaped strip portions 52 has a bent portion 522 disposed above the ends 521 thereof. The first U-shaped strip portions 52 of adjacent ones of the bridging units 50 are disposed in a staggered arrangement. Each of the second U-shaped strip portions 53 has two ends 531 that are connected respectively to corresponding one of the straight strip portions 51. The second U-shaped strip portions 52 of each of the bridging units 50 are disposed on a lower side of the corresponding ones of the straight strip portions 51, and are arranged in a row along the second direction (B). The first and second U-shaped strip portions 52, 53 of each of the bridging units-50 are alternately disposed. Each of the second U-shaped strip portions 53 of the bridging units 50 has a bent portion 532 that is disposed fixedly on and that is in thermal communication with the connecting surface 542 of the base plate 54. The straight strip portions 51 of the fin strip unit are disposed in a plane that is parallel to the base plate 54. It is noted that the fin strip unit can be formed by punching and pressing a thin metal plate.

The fan unit 32 is mounted removably on the front open end 451 of the drawer body 4 for blowing air toward or drawing air from the heat dissipating device 5 so as to dissipate heat accumulated on the heat dissipating device 5.

In actual operation, due to the presence of the heat dissipating device 5, heat generated by the disk drive 39 can be effectively dissipated to reduce the operating temperature of the disk drive 39.

Figure 5:
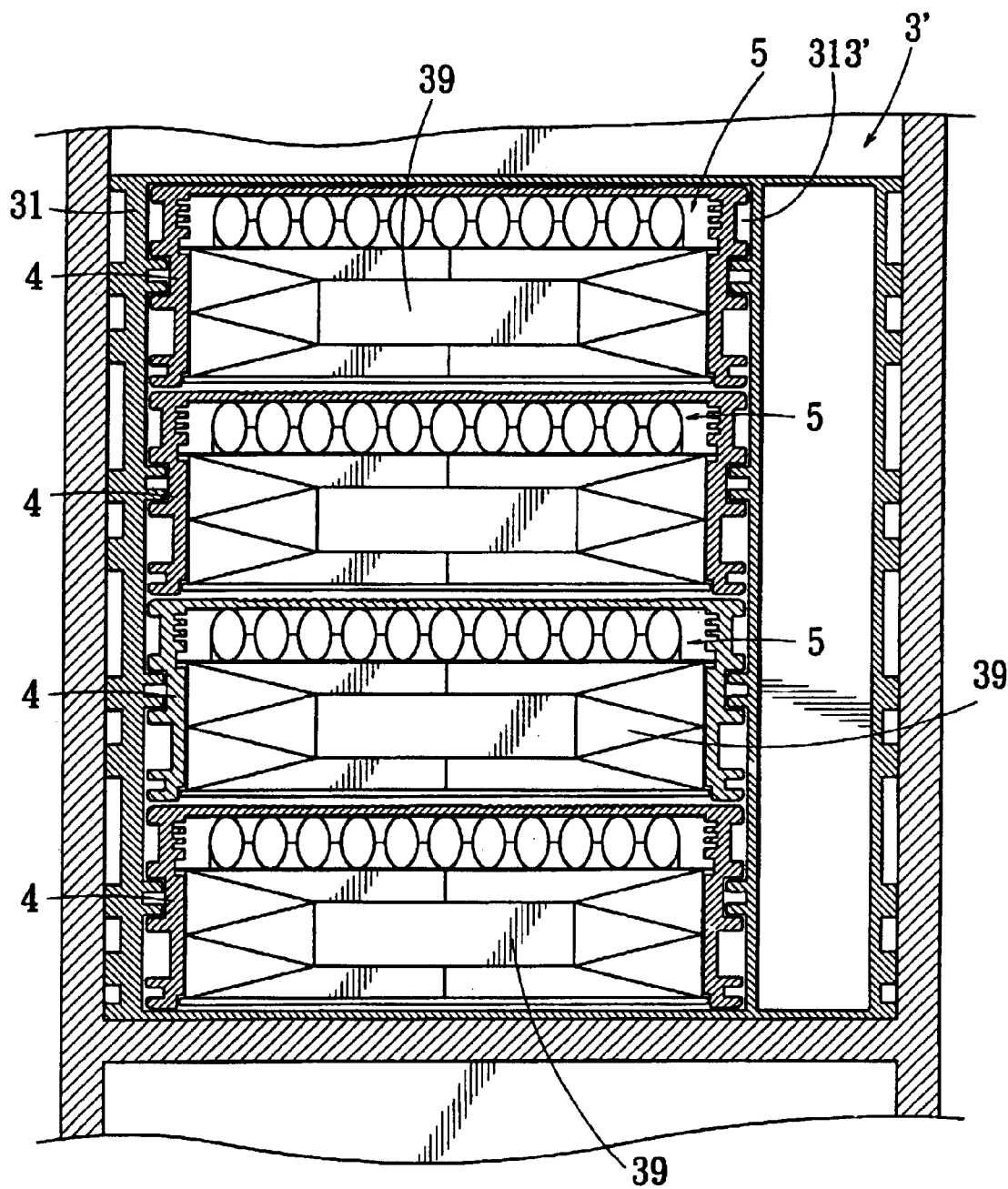
FIG. 5 is a schematic sectional view showing the second preferred embodiment of a disk drive apparatus for a computer device according to the present invention.

FIG. 5 illustrates the second preferred embodiment of a disk drive apparatus 3' according to the present invention invention, which is a modification of the first preferred embodiment. Unlike the previous embodiment, the disk drive apparatus 3' includes a plurality of drawer bodies 4 that are mounted removably in the slot 313' of the mounting frame 31' and that are arranged in an array, and a plurality of disk drives 39 that are mounted removably and respectively in the drawer bodies 4. Each of the drawer bodies 4 has the heat dissipating device 5 mounted therein.

Figure 6:
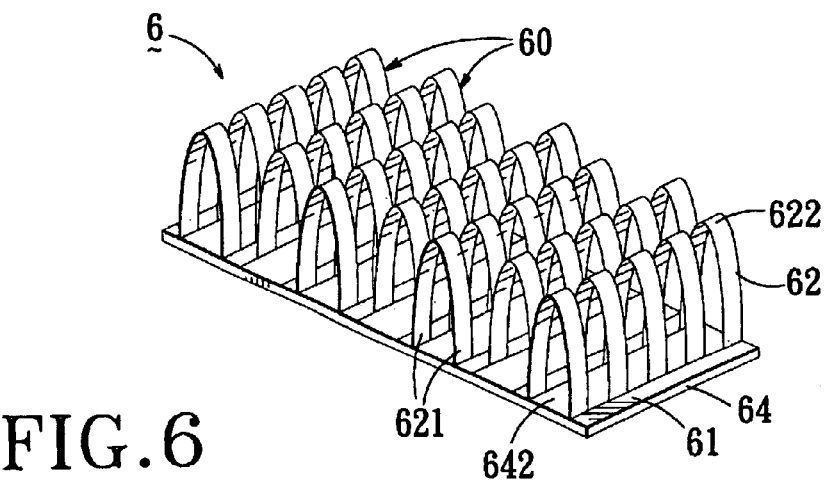
FIG. 6 is a perspective view showing a unitary heat-dissipating fin strip unit of the third preferred embodiment of a disk drive apparatus for a computer device according to the present invention.

FIG. 6 illustrates a heat dissipating device 6 of the third preferred embodiment of a disk drive apparatus according to the present invention, which is modification of the first preferred embodiment. Unlike the previous embodiments, each of the straight strip portions 61 is disposed fixedly on and is in thermal communication with the connecting surface 642 of the base plate 64. Each of the bridging units 60 of the fin strip unit of the heat dissipating-device 6 includes a plurality of U-shaped strip portions 62, each of which has two ends 621 that are connected respectively to corresponding ones of the straight strip portions 61. The U-shaped strip portions 62 of each bridging unit 60 are disposed on an upper side of the corresponding ones of the straight strip portions 61. Each of the U-shaped strip portions 62 has a bent portion 622 disposed above the ends 621 thereof. The U-shaped strip portions 62 of adjacent ones of the bridging units 60 are disposed in a staggered arrangement.

Figure 7:
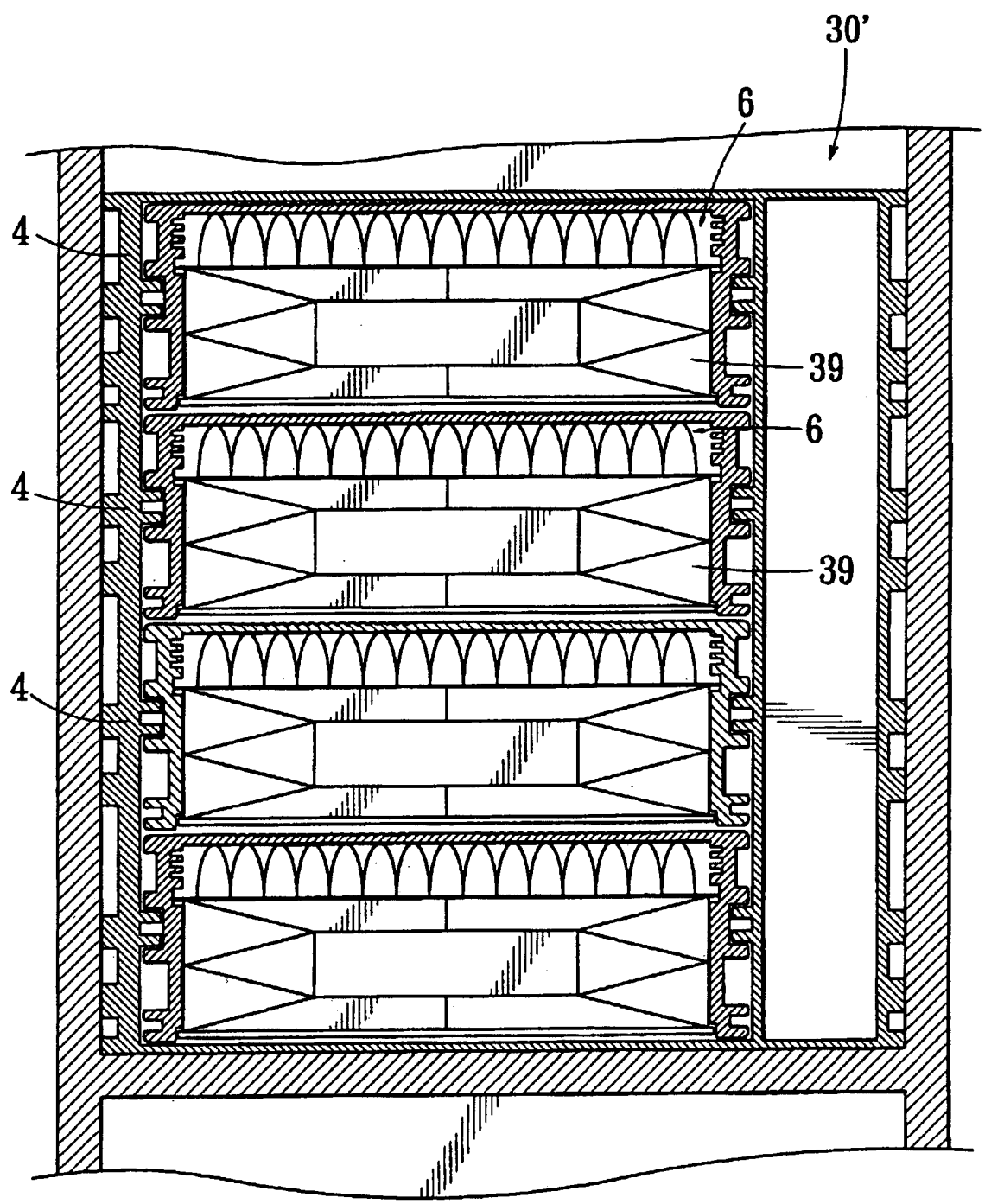
FIG. 7 is a schematic sectional view showing the fourth preferred embodiment of a disk drive apparatus for a computer device according to the present invention.

FIG. 7 illustrates the fourth preferred embodiment of a disk drive apparatus 30' according to the present invention, which is modification of the second preferred embodiment. In this embodiment, the heat dissipating devices 5 utilized in the second preferred embodiment of FIG. 5 are replaced with the heat dissipating devices 6 shown in the third preferred embodiment of FIG. 6.

Figure 8:
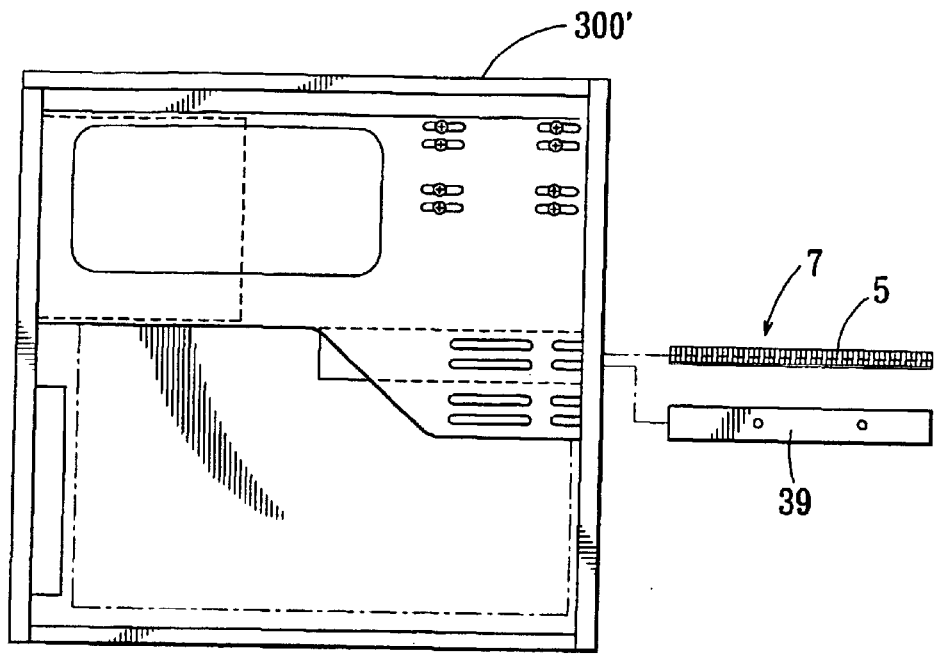
FIG. 8 is a partly exploded schematic view showing the fifth preferred embodiment of a disk drive apparatus for a computer device according to the present invention.
Figure 9:
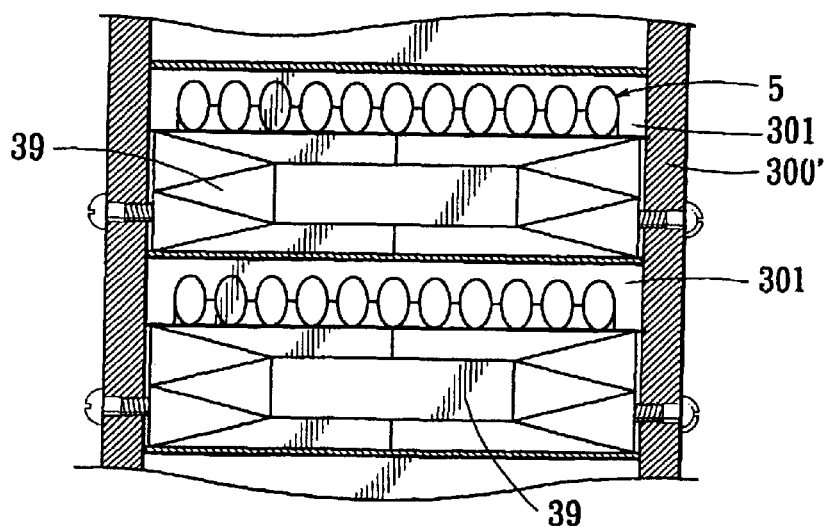
FIG. 9 is a schematic sectional view showing the fifth preferred embodiment.

FIGS. 8 and 9 illustrate the fifth preferred embodiment of a disk drive apparatus 7 according to the present invention, which is modification of the first preferred embodiment. Unlike the previous embodiments, the computer housing 300' is formed with a plurality of slots 301. Each disk drive 39 is adapted to be mounted fixedly in a corresponding one of the slots 310 in the computer housing 300'. Heat dissipating devices 5 similar to those of the first preferred embodiment of FIG. 4 are adapted to be mounted fixedly and respectively in the slots 301 in the computer housing 300', and are disposed on and is in thermal communication with the disk drives 39 in the slots 301.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A heat dissipating device for dissipating heat generated by a disk drive module inside a computer housing, the disk drive module including
    a mounting frame mounted in the computer housing and formed with a slot,
    a drawer body mounted removably in the slot and having front and rear open ends, top and bottom walls, and opposite lateral walls connected to and cooperating with the top and bottom walls so as to confine a receiving space that is accessible through one of the front and rear open ends, and
    a disk drive mounted removably in the receiving space through said one of the front and rear open ends and mounted on the bottom wall of the drawer body,
    said heat dissipating device being adapted to be disposed in the receiving space and comprising:
        a base plate adapted to be mounted between the lateral walls of the drawer body, said base plate having a contacting surface adapted to contact and to be in thermal communication with the disk drive, and a connecting surface opposite to said contacting surface; and
        a unitary heat-dissipating fin strip unit mounted fixedly on and in thermal communication with said connecting surface of said base plate, said fin strip unit including
            a row of straight strip portions arranged along a first direction, each adjacent pair of said straight strip portions being spaced apart from each other so as to define a heat-dissipating space therebetween, and
            a plurality of bridging units disposed respectively within said heat-dissipating spaces, each of said bridging units including a plurality of first U-shaped strip portions, each of which has two ends that are connected respectively to corresponding ones of said straight strip portions, said first U-shaped strip portions of each of said bridging units being disposed on one side of the corresponding ones of said straight strip portions and being arranged in a row along a second direction, which is transverse to the first direction.

2. The heat dissipating device as claimed in claim 1, wherein each of said first U-shaped strip portions has a bent portion disposed above said ends thereof, and said first U-shaped strip portions of adjacent ones of said bridging units are disposed in a staggered arrangement.

3. The heat dissipating device as claimed in claim 1, wherein each of said bridging units further includes a plurality of second U-shaped strip portions, each of which has two ends that are connected-respectively to corresponding ones of said straight strip portions, said second U-shaped strip portions of each of said bridging units being disposed on the opposite side of the corresponding ones of said straight strip portions, and being arranged in a row along the second direction.

4. The heat dissipating device as claimed in claim 3, wherein said first and second U-shaped strip portions of each of said bridging units are alternately disposed.

5. The heat dissipating device as claimed in claim 4, wherein each of said second U-shaped strip portions of said bridging units has a bent portion that is disposed fixedly on and that is in thermal communication with said connecting surface of said base plate, said straight strip portions of said fin strip unit being disposed in a plane that is parallel to said base plate.

6. The heat dissipating device as claimed in claim 1, wherein each of said straight strip portions is disposed fixedly on and is in thermal communication with said connecting surface of said base plate.

7. A disk drive apparatus for a computer device, comprising:
    a mounting frame adapted mounted in a computer housing of the computer device and formed with a slot;
    a drawer body mounted removably in said slot and having front and rear open ends, top and bottom walls, and opposite lateral walls connected to and cooperating with said top and bottom walls so as to confine a receiving space that is accessible through one of said front and rear open ends;
    a disk drive mounted removably in said receiving space through said one of said front and rear open ends and mounted on said bottom wall of said drawer body; and
    a heat dissipating device disposed in said receiving space and including
        a base plate mounted between said lateral walls of said drawer body, said base plate having a contacting surface contacting and in thermal communication with said disk drive, and a connecting surface opposite to said contacting surface, and
        a unitary heat-dissipating fin strip unit mounted fixedly on and in thermal communication with said connecting surface of said base plate, said fin strip unit including
            a row of straight strip port ions arranged along a first direction, each adjacent pair of said straight strip portions being spaced apart from each other so as to define a heat-dissipating space therebetween, and a plurality of bridging units disposed respectively within said heat-dissipating spaces, each of said bridging units including a plurality of U-shaped strip portions, each of which has two ends that are connected respectively to corresponding ones of said straight strip portions, said U-shaped strip portions of each of said bridging units being disposed on one side of the corresponding ones of said straight strip portions and being arranged in a row along a second direction, which is transverse to the first direction.

* * * * *